(12) United States Patent
Takeuchi (10) Patent No.: US 7,733,750 B2
(45) Date of Patent: Jun. 8, 2010

(54) INFORMATION RECORDING METHOD FOR RECORDING MULTI-VALUE DATA IN OPTIMUM RECORDING CONDITION

(75) Inventor: Kohji Takeuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1236 days.

(21) Appl. No.: 11/268,648

(22) Filed: Nov. 8, 2005

(65) Prior Publication Data

US 2006/0067198 A1 Mar. 30, 2006

Related U.S. Application Data

(63) Continuation of application No. PCT/JP2004/003529, filed on Mar. 17, 2004.

(30) Foreign Application Priority Data

May 28, 2003 (JP) ............................. 2003-150354

(51) Int. Cl.
*G11B 7/12* (2006.01)
(52) U.S. Cl. ................................... 369/47.53
(58) Field of Classification Search ....................... None
See application file for complete search history.

(56) References Cited

U.S. PATENT DOCUMENTS

| | | | |
|---|---|---|---|
| 5,726,954 A | 3/1998 | Matsumoto et al. | |
| 5,841,747 A | 11/1998 | Kubota et al. | |
| 5,862,103 A | 1/1999 | Matsumoto et al. | |
| 6,608,807 B1 * | 8/2003 | Lee .......................... | 369/59.26 |
| 6,775,218 B1 * | 8/2004 | O'Neill et al. ............ | 369/59.11 |
| 2001/0036143 A1 | 11/2001 | Ohno et al. | |
| 2002/0031068 A1 * | 3/2002 | Hoeven .................... | 369/47.53 |
| 2002/0126604 A1 * | 9/2002 | Powelson et al. ........ | 369/47.53 |
| 2002/0141316 A1 | 10/2002 | Tsukamoto | |
| 2002/0186648 A1 | 12/2002 | Ohno et al. | |

FOREIGN PATENT DOCUMENTS

| | | |
|---|---|---|
| EP | 1 246 176 A2 | 10/2002 |
| EP | 1 347 445 A2 | 9/2003 |
| JP | 8-287467 | 11/1996 |
| JP | 9-63056 | 3/1997 |
| JP | 10-106008 | 4/1998 |
| JP | 10-134353 | 5/1998 |

(Continued)

OTHER PUBLICATIONS

Office Action for application JP2004-160122 dated Jul. 8, 2008.

(Continued)

*Primary Examiner*—Christopher R Lamb
(74) *Attorney, Agent, or Firm*—Dickstein Shapiro LLP (57) ABSTRACT

An information recording method that obtains optimum recording conditions for recording multi-value data m on a recording medium includes recording a test pattern in a trial writing area of the recording medium by changing a recording power Pw and an erasing power Pe consecutively while maintaining a constant ratio between the recording power Pw and the erasing power Pe, and selecting the recording power Pw and the erasing power Pe producing reproduced results in which a reproduced signal level is substantially linear with respect to the multi-value data m, as an optimum recording power and an optimum erasing power, respectively.

2 Claims, 6 Drawing Sheets

| | FOREIGN PATENT DOCUMENTS | |
|---|---|---|
| JP | 2002-50046 | 2/2002 |
| JP | 2002-183954 | 6/2002 |
| JP | 2002-245626 | 8/2002 |
| JP | 2003-91822 | 3/2003 |
| JP | 2003-157532 | 5/2003 |
| JP | 2003-162817 | 6/2003 |
| WO | WO 00/25308 | 5/2000 |
| WO | WO 01/57856 A1 | 8/2001 |

OTHER PUBLICATIONS

JP2004-160122 Office Action, Jul. 4, 2008.

\* cited by examiner

INFORMATION RECORDING METHOD FOR RECORDING MULTI-VALUE DATA IN OPTIMUM RECORDING CONDITION

CROSS-REFERENCE TO RELATED APPLICATION

This is a continuation of International Application No. PCT/JP2004/003529, filed on Mar. 17, 2004, the entire contents of which are hereby incorporated by reference.

BACKGROUND OF THE INVENTION

1. Field of the Invention

The present invention generally relates to methods of recording information on recording media such as rewritable optical discs, and particularly relates to an information recording method that records multi-value data on a recording medium by modulating the area size of recording marks.

2. Description of the Related Art

In respect of rewritable optical discs, there are product-to-product variations in optical discs and in optical disc recording/reproducing apparatuses, and also the varying conditions of use environment have some effect, so that the recording conditions need to be optimized with respect to each combination. In phase-change-type optical discs, the light emission period, recording power, and erasing power of a recording laser are controlled for the purpose of forming desired recording marks.

Conventional information recording methods are configured to achieve the uniformity of recording marks by controlling the recording power and/or recording pulse width according the linear recording velocity in order to achieve high-speed recording (see Japanese Patent Application Publication No. 10-106008, for example). Further, the recording conditions are optimized by feeding back the results of reproduction of recorded data to the recording pulse waveforms (see Japanese Patent Application Publication No. 2002-50046, for example).

The conventional information recording methods as described above are directed to setting optimum recording conditions in the case of binary recording. In binary recording, jitter worsens when a slice level for binarization changes (see FIG. 5 of Japanese Patent Application Publication No. 10-106008, for example). Because of this, the recording conditions are selected such as to set asymmetry within a predetermined value range, thereby optimizing the recording conditions. In multi-value recording, however, there is a need to suppress a deviation in the voltage direction (i.e., the signal level produced by marks) rather than a time deviation (i.e., the mark length or space length). In multi-value recording, therefore, the method of setting optimum recording conditions based on asymmetry as in the conventional information recording method cannot be used.

In the following, a description will be given of multi-value recording relating to the information recording method of the present invention.

Figure 8:
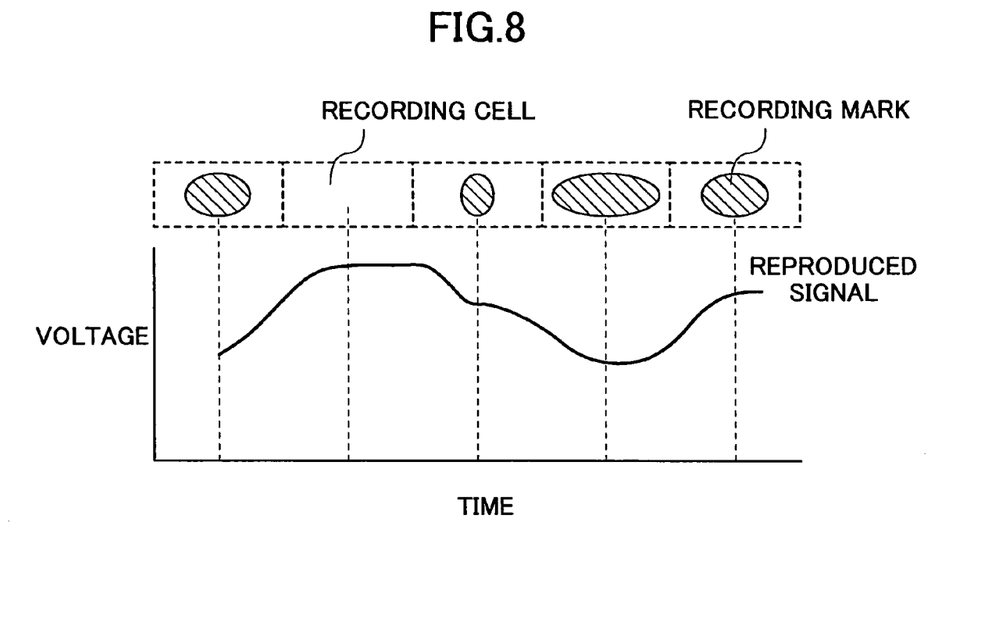
FIG. 8 is a drawing for explaining multi-value recording applied to the information recording method of the present invention.
Figure 9:
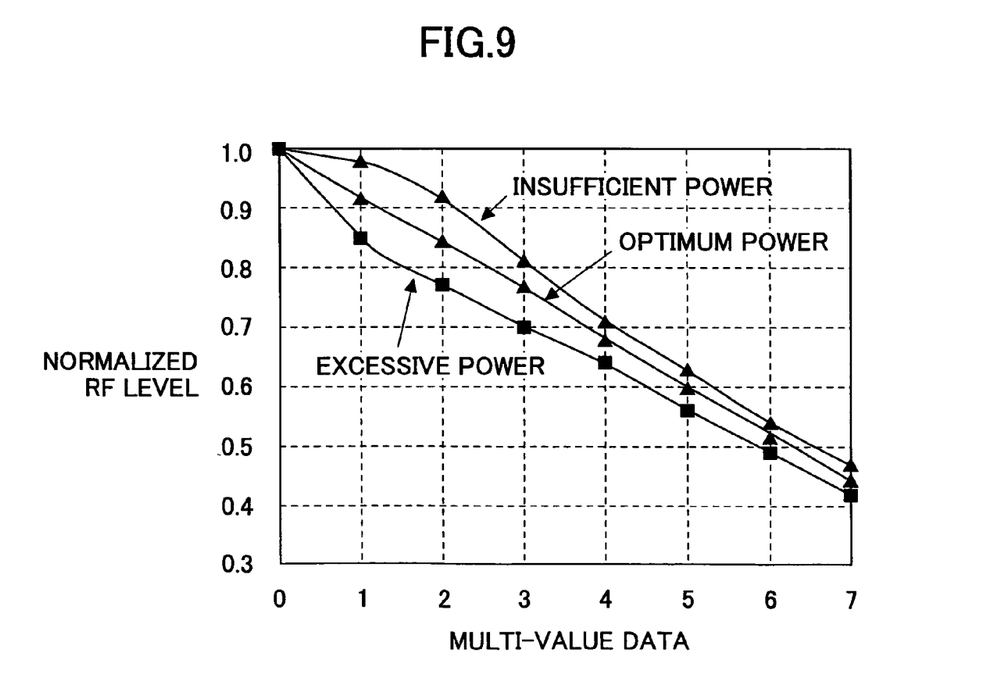
FIG. 9 is a drawing, likewise, for explaining multi-value recording applied to the information recording method of the present invention.
Figure 10:
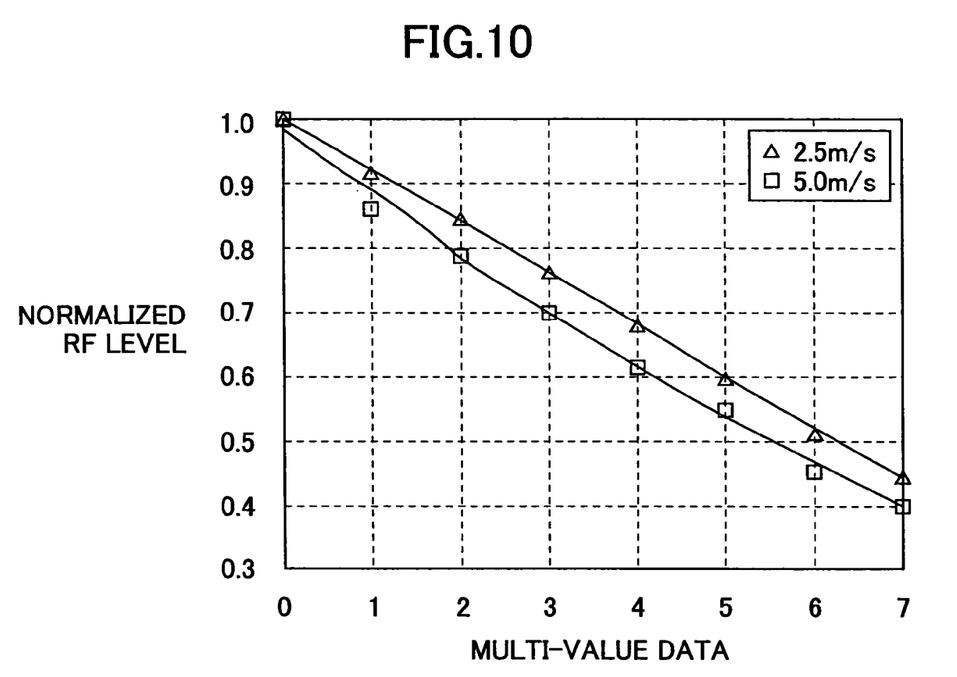
FIG. 10 is a drawing, likewise, for explaining multi-value recording applied to the information recording method of the present invention.

FIG. 8 through FIG. 10 are drawings for explaining multi-value recording relating to the information recording method of the present invention.

As shown in FIG. 8, multi-value data is recorded separately for each recording cell that has a constant length, such that the level of a reproduced signal changes in response to the multi-value data. The reproducing of multi-value data is performed by sampling the reproduced signal at predetermined frequency (at the center position of each recording cell, for example) and by discriminating the multi-value data based on the level of the sampled signal. When a solitary wave that has no inter-code interference as recorded data is recorded for multi-value levels "0" through "7", the level of the reproduced signal change linearly in response to the multi-value data as shown in FIG. 9, provided that the recording conditions are optimized.

If the recording conditions are not optimized, linearity deteriorates as shown in FIG. 9 due to too strong or too weak a recording power. Especially, a shorter recording mark (corresponding to multi-value data "1" through multi-value data "3") is susceptible to the recording conditions and external influence. When the recording power is not sufficiently strong, for example, a gap between the threshold values for discriminating multi-value data narrows for multi-value data "1" through "3", giving rise to a problem that the margin for reproduction decreases.

In order to achieve high-speed recording, the rate of disc revolution may be made constant, and the reference clock cycle of a recording signal may be changed according to radial position along the disc radius. Such high-speed recording is employed to record the CLV format in some recording media such as the rewritable DVDs.

When this method is applied to multi-value recording, recording is performed by changing the reference clock according to the linear recording velocity. Since the recording sensitivity of an optical disc is not linear with respect to linear recording velocity, however, the shorter marks (corresponding to multi-value data "1" through "3") tend to be formed larger as shown in FIG. 10. Namely, the relationship between the multi-value data and the signal levels varies according to the linear recording velocity, which creates a need to learn a multi-value discrimination level and/or waveform equalization coefficient separately for each linear recording velocity. At the time of reproduction, the multi-value discrimination level and waveform equalization coefficient corresponding to the linear velocity are retrieved for reproduction, which gives rise to a problem that reproduction becomes time consuming.

In consideration of the above, there is a need in multi-value recording to achieve stable recording regardless of changes in ambient conditions and product-to-product variation in recording media such as optical discs and information recording apparatuses such as optical disc apparatuses for recording information on such recording media.

Also there is a need in multi-value recording to achieve information recording that allows a substantially constant reproduced signal level to be obtained over the entire surface of a recording medium when multi-value data is recorded by the CAV method with constant linear recording density.

SUMMARY OF THE INVENTION

A general object of the present invention is to provide an information recording method that substantially obviates one or more problems caused by the limitations or shortcomings of the related technology as described above.

In order to achieve the above object according to the present invention, an information recording method that obtains optimum recording conditions for recording multi-value data m on a recording medium is characterized in that a test pattern is recorded in a trial writing area of the recording medium by changing a recording power Pw and an erasing power Pe consecutively while maintaining a constant ratio between the recording power Pw and the erasing power Pe, and the recording power Pw and the erasing power Pe producing reproduced results in which a reproduced signal level is substantially linear with respect to the multi-value data m are selected as an optimum recording power and an optimum erasing power, respectively.

According to another aspect of the present invention, an information recording method that obtains optimum recording conditions for recording multi-value data m on a recording medium is characterized in that a test pattern is recorded in a trial writing area of the recording medium by consecutively changing a ratio Pe/Pw between an erasing power Pe and a recording power Pw, and the ratio Pe/Pw producing reproduced results in which a reproduced signal level is substantially linear with respect to the multi-value data m is selected as an optimum ratio.

According to another aspect of the present invention, an information recording method that obtains optimum recording conditions for recording multi-value data m on a recording medium is characterized in that a test pattern is recorded in a trial writing area of the recording medium by consecutively changing a cooling pulse width Toff_m for the multi-value data m, and the cooling pulse width Toff_m producing reproduced results in which a reproduced signal level is substantially linear with respect to the multi-value data m is selected as an optimum cooling pulse width.

According to another aspect of the present invention, an information recording method that obtains optimum recording conditions for recording multi-value data m on a recording medium is characterized in that a test pattern is recorded in a trial writing area of the recording medium by consecutively changing a recording pulse width Ton_m for the multi-value data m, and the recording pulse width Ton_m producing reproduced results in which a reproduced signal level is substantially linear with respect to the multi-value data m is selected as an optimum recording pulse width.

According to another aspect of the present invention, an information recording method for recording multi-value data m on a recording medium, wherein the multi-value data m is recorded on the recording medium with constant linear recording density by changing a recording clock cycle in response to a change in linear recording velocity, is characterized in that a test pattern is recorded in a trial writing area of the recording medium by changing a recording power Pw and an erasing power Pe with respect to a plurality of linear recording velocities, and the recording power Pw and the erasing power Pe producing linear-recording-velocity-specific reproduced results in which a reproduced signal level is substantially linear with respect to the multi-value data m are selected as a linear-recording-velocity-specific optimum recording power and a linear-recording-velocity-specific optimum erasing power, respectively.

According to another aspect of the present invention, an information recording method for recording multi-value data m on a recording medium, wherein the multi-value data m is recorded on the recording medium with constant linear recording density by changing a recording clock cycle in response to a change in linear recording velocity, is characterized in that a test pattern is recorded by changing a cooling pulse width Toff_m or recording pulse width Ton_m uniformly in response to linear recording velocity, and the cooling pulse width or recording pulse width is selected that produces linear-recording-velocity-specific reproduced results in which a reproduced signal level is substantially linear with respect to the multi-value data m.

According to another aspect of the present invention, in the information recording method as described above, a relational expression $y=av+b$ (a, b: constant values) is obtained based on the results obtained from trial writing in the trial writing area of the recording medium where v is a linear recording velocity and y is a recording condition which is one of the recording power Pw, a ratio Pe/Pw, the recording pulse width Ton_m, and the cooling pulse width Toff_m, and recording is performed by changing the recording condition y according to the relational expression in response to the linear recording velocity v.

According to another aspect of the present invention, the information recording method as described above, a relational expression $y=av^2+bv+c$ (a, b, c: constant values) is obtained based on the results obtained from trial writing in the trial writing area of the recording medium where v is a linear recording velocity and y is a recording condition which is one of the recording power Pw, a ratio Pe/Pw, the recording pulse width Ton_m, and the cooling pulse width Toff_m, and recording is performed by changing the recording condition y according to the relational expression in response to the linear recording velocity v.

According to another aspect of the present invention, in the information recording method as described above, the test pattern includes $M^2$ combinations of multi-value data patterns having front-back symmetry for M-value recording of the multi-value data m on the recording medium.

According to another aspect of the present invention, in the information recording method as described above, a recording condition of the recording power Pw, a ratio Pe/Pw, the recording pulse width Ton_m, or the cooling pulse width Toff_m for M-value recording of the multi-value data m on the recording medium is selected such as to minimize $\Sigma\{Vm'-V(m)\}^2$ with respect to m=1, 2, ..., M−1 in the reproduced results from the recording medium, where Vm' is a sampled reproduced signal level of the multi-value data m, and $V(m)=m*(VM-1'-V0')/(M-1)+V0$ is a target signal level.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described in detail with reference to the accompanying drawings.

First Embodiment

The information recording method according to the first embodiment performs a trial writing on a recording medium by changing any one of the recording conditions of a recording power Pw, a ratio of an erasing power Pe to the recording power Pw, a recording pulse width $\Delta$Ton, and a cooling pulse width $\Delta$Toff, and determines optimum recording conditions from the reproduced results by focusing attention on linearity between the multi-value data and the levels of reproduced signals.

Compared with a method that determines optimum recording conditions by measuring an error rate of multi-value discrimination, thus, a simpler method can make such determination. As a test pattern for trial writing, a pattern (XYX) in which multi-values are arranged in front-back symmetry is prepared. In the case of 8-value recording, there are 64 combinations (see Table 1).

TABLE 1

| X | Y | X | X | Y | X | | | | X | Y | X |
|---|---|---|---|---|---|---|---|---|---|---|---|
| 0 | 0 | 0 | 1 | 0 | 1 | — | — | — | 7 | 0 | 7 |
| 0 | 1 | 0 | 1 | 1 | 1 | — | — | — | 7 | 1 | 7 |
| 0 | 2 | 0 | 1 | 2 | 1 | — | — | — | 7 | 2 | 7 |
| — | — | — | — | — | — | — | — | — | — | — | — |
| — | — | — | — | — | — | — | — | — | — | — | — |
| 0 | 7 | 0 | 1 | 7 | 1 | — | — | — | 7 | 7 | 7 |

Figure 2:
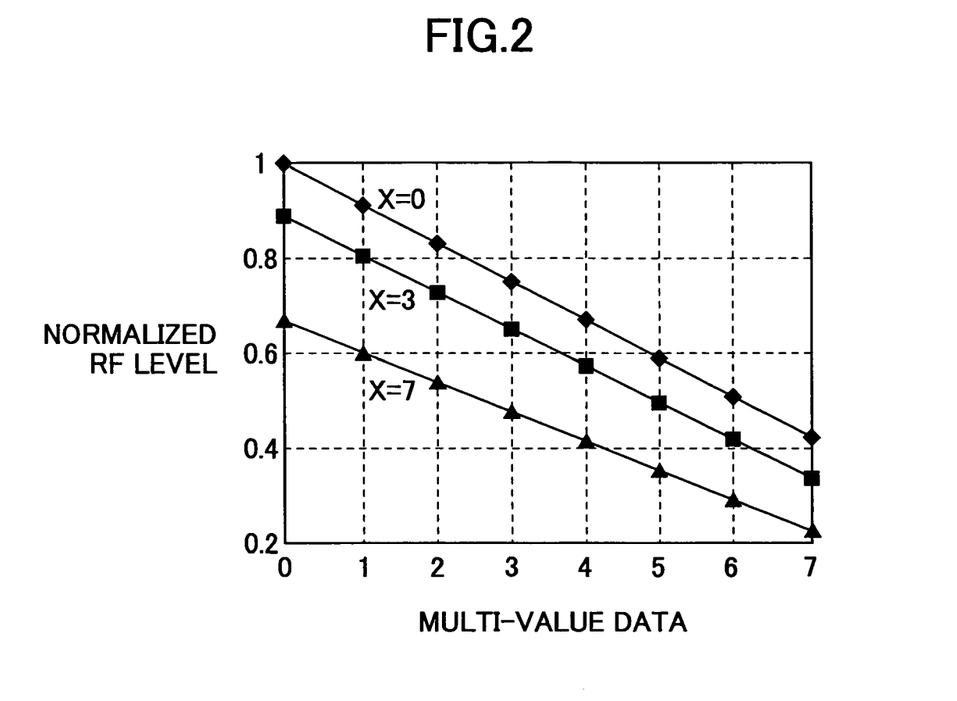
FIG. 2 is a drawing showing relationship between multi-value data and normalized RF levels in the information recording method according to the first embodiment.

FIG. 2 is a drawing showing relationship between multi-value data and normalized RF levels in the information recording method according to the first embodiment.

The recording conditions are selected such that when these patterns are recorded and reproduced, the level of a reproduced signal for Y is substantially linear with respect to each X, as shown in the figure.

With the use of these test patterns, a check can be performed as to whether linearity is kept not only in the case of a solitary wave having no inter-code interference but also in the case of inter-code interference being present.

An optical disc serving as a recording medium of the first embodiment is a phase-change-type optical disc that is recordable by use of laser light having a wavelength of 650 nm. The substrate is made of polycarbonate that is 120 mm in diameter and 0.6 mm in thickness. A surface of the substrate has a groove formed by injection molding.

The groove is 0.35 μm in width and 30 nm in depth, and is created in spiral form that extends continuously from inner circumference to outer circumference at a track pitch of 0.74 μm.

On the substrate, a dielectric film, a phase-change recording film made of Ag—In—Sb—Te, a dielectric film, and a reflective film are stacked one over another, thereby forming a phase-change-type optical disc.

In data recording/reproducing, a recording/reproducing apparatus with a wavelength of 650 nm and the objective lens of NA 0.65 is used to perform 8-value recording. Further, the linear velocity is set to 2.5 m/s, the recording clock cycle to T=10 ns, and the length of a cell in the circumferential direction to 0.40 μm (16 T). With this, recording is performed with the data length and recording pulse length of each multi-value data being set as shown in Table 1.

Figure 3:
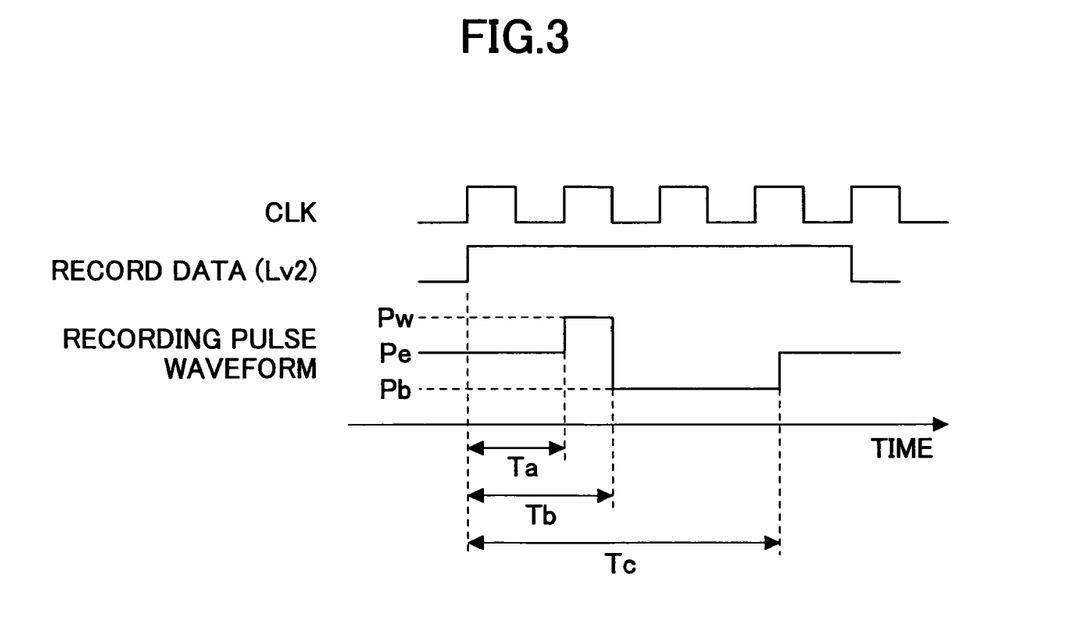
FIG. 3 is a drawing showing a recording pulse waveform corresponding to multi-value data "2"

FIG. 3 is a drawing showing a recording pulse waveform corresponding to multi-value data "2".

As shown in the figure, the recording pulse waveform is generated in response to a recording data pulse. The recording pulse waveform is defined by a rise Ta of the recording pulse, a fall Tb of the recording pulse, and a rise Tc of the erasing pulse.

The recording pulse width Ton and the cooling pulse width Toff shown in Table 2 are defined as Ton=Tb−Ta and Toff=Tc−Tb.

Typical power conditions for a linear velocity of 2.5 m/s are as follows: recording power Pw=15.0 mW; erasing power Pe=6.9 mW; and bias power Pb=0.1 mW.

TABLE 2

| Multi-value Data | Data length (T) | Ton(T) | Toff(T) |
|---|---|---|---|
| 1 | 2 | 1.00 | 1.15 |
| 2 | 4 | 1.00 | 1.85 |
| 3 | 6 | 1.62 | 2.08 |
| 4 | 8 | 1.62 | 2.85 |
| 5 | 10 | 2.38 | 3.46 |
| 6 | 12 | 3.00 | 4.46 |
| 7 | 14 | 3.00 | 8.62 |

Figure 4:
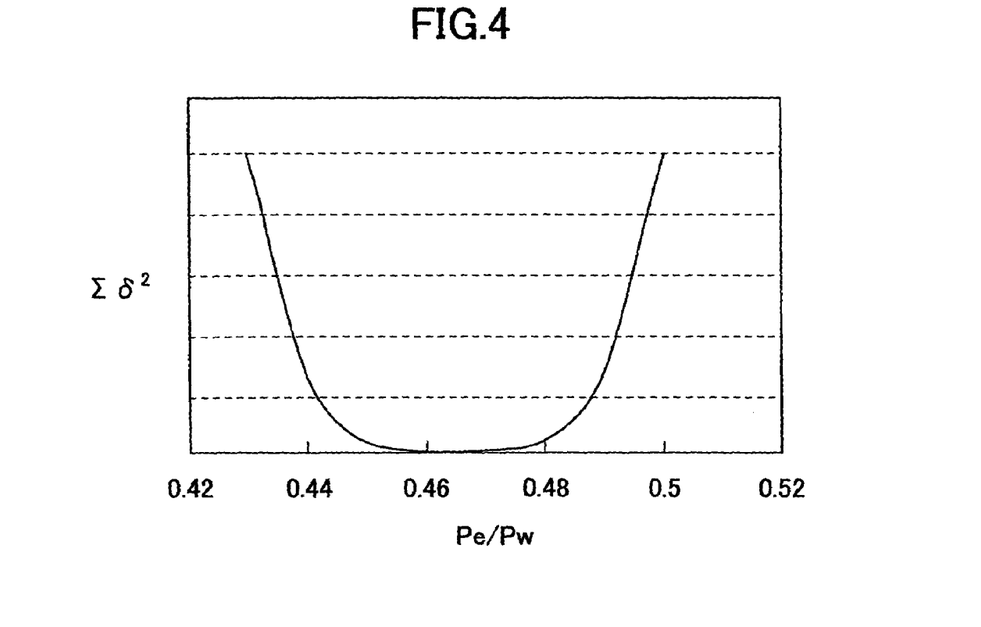
FIG. 4 is a drawing showing a change in $\Sigma\delta^2$ when the test patterns are recorded while changing a ratio of erasing power Pe to recording power Pw.

FIG. 4 is a drawing showing a change in $\Sigma\delta^2$ when the test patterns are recorded while changing a ratio of the erasing power Pe to the recording power Pw.

In this example, XYX patterns corresponding to 64 combinations are used as the test patterns for trial writing.

Further, $\Sigma\delta^2$ is defined as shown in the following formula (1), and serves as an indication indicating how much linearity the level of a reproduced signal exhibits with respect to multi-value data. Here, Vm is the level of a reproduced signal corresponding to sampled multi-value data m, and V(m)=m*(V7'−V0')/7+V0 is a target signal level of the multi-value data m. If recording is performed by using the ratio of erasing power Pe to recording power Pw that minimizes $\Sigma\delta^2$ defined in the formula (1), an error rate of multi-value discrimination after waveform equalization becomes smaller than $10^{-3}$ for recorded random patterns.

$$\Sigma\delta^2 = \Sigma\{Vm' - V(m)\}^2 \ (m=1, 2, \ldots, 6) \quad (1)$$

Figure 1:
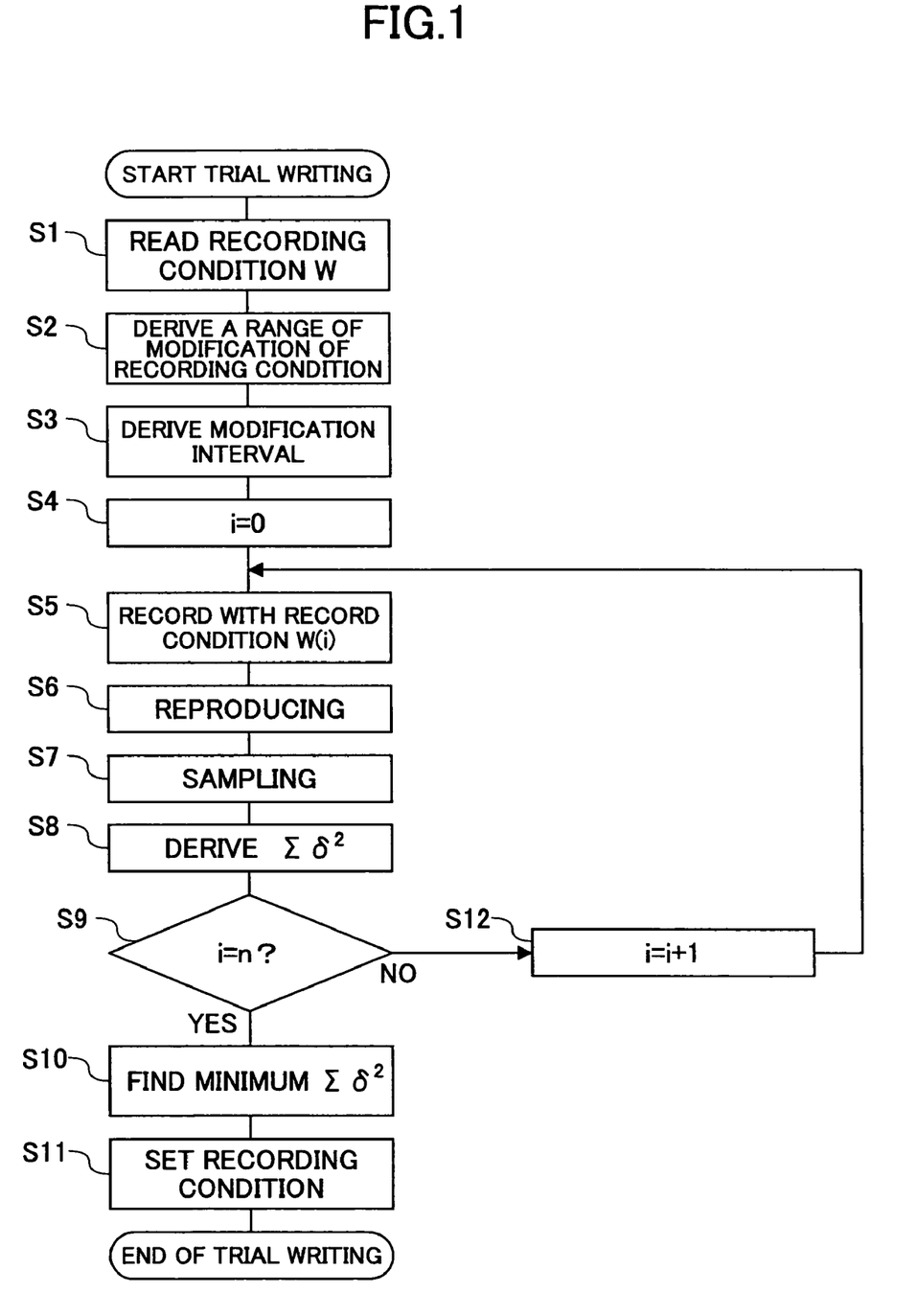
FIG. 1 is a flowchart showing a method of determining recording conditions by use of trial writing according to the information recording method of the first embodiment.

FIG. 1 is a flowchart showing a method of determining recording conditions by use of trial writing according to the information recording method of the first embodiment.

In this process, at step (indicated as "S" in the figure) 1, a control unit of the information recording/reproducing apparatus such as a DVD drive implemented as a microcomputer comprised of a CPU, ROM, RAM, etc., for example, reads recording conditions W (each power setting, each pulse width setting) stored as pre-format information on the optical disc.

At step 2, a range within which the recording conditions are modified is derived. If the ratio of the erasing power to the recording power retrieved at step 1 is 0.46, for example, the modification range is derived as (1±0.1)*0.46, i.e., 0.41 to 0.51 (settings are changed by 10% in this example).

At step 3, modification intervals are derived. 7 conditions (i.e., 7 levels) are set, for example, over the range derived at step 2. At step 4, "i" is set to 0 as an initial setting. At step 5, trial writing is performed with the recording conditions W (i=0).

At step 6, reproduction is performed. At step 7, the reproduced signal is sampled. At step 8, $\Sigma\delta^2$ as described above is computed based on the sampled results, and the computed results are stored in a storage device of the information recording/reproducing apparatus.

At step 9, a check is made as to whether i=n (n=7 in this example). If trial writing for 7 conditions are not yet completed, i=i+1 is performed at step 12. The procedure then goes back to the process of step 5 to perform trial writing with the next recording conditions. If i=n at step 9, the recording conditions that minimizes $\Sigma\delta^2$ among the 7 conditions are selected at step 10. At step 11, the recording conditions selected at step 10 are set as optimum conditions. With this, the process of trial (writing) recording comes to an end.

In stead of the ratio of erasing power Pe to recording power Pw, the recording pulse width Ton or the cooling pulse width Toff may be used to adjust the power to an optimum condition as shown in FIG. 9.

When the pulse width is used for adjustment, the recording pulse width Ton or cooling pulse width Toff of multi-value data "1" through "7" is changed uniformly by a constant amount to find the value that minimizes $\Sigma\delta^2$ in the same manner as in the case of the ratio of erasing power Pe to recording power Pw.

As the characteristics of optical discs, a small degree of modulation ((V7'−V0')/V0') means a small reproduction margin, so that a degree of modulation needs to be greater than 50%, and may preferably be greater than 60%. Further, trial writing is performed prior to real recording, thereby optimizing the recording conditions for each combination of an optical disc and a recording/reproducing apparatus.

Second Embodiment

The information recording method according to a second embodiment performs trial writing by use of a plurality of linear recording velocities when performing recording of constant linear density through the CAV driving, and determines optimum recording conditions for each linear velocity by using the information recording method as described in connection with the above-described second embodiment.

Based on these results, a relational expression between the linear recording velocity and the optimum recording conditions is derived. The recoding conditions are then changed according to the relational expression in response to the linear recording velocity, thereby achieving substantially the same reproduced signal level over the entire surface of an optical disc.

Figure 5:
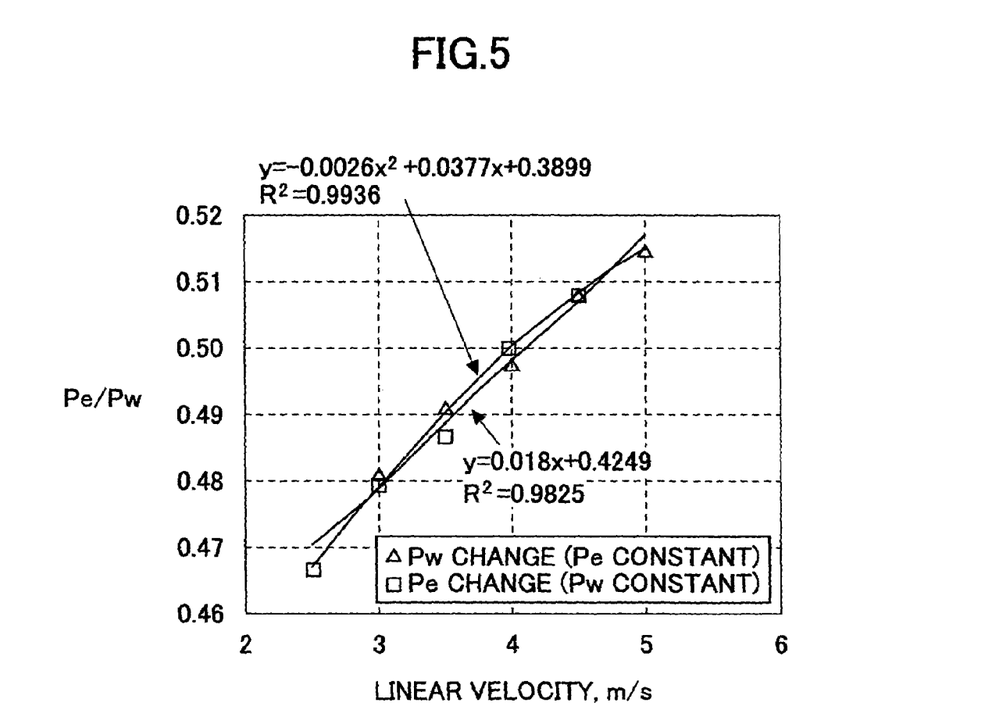
FIG. 5 is a line chart in which the value of a Pe/Pw ratio that minimizes $\Sigma\delta^2$ is plotted when test patterns are recorded by changing the linear recording velocity from 2.5 m/s to 5.0 m/s.

FIG. 5 is a line chart in which the value of the Pe/Pw ratio that minimizes $\Sigma\delta^2$ is plotted when the test patterns are recorded by changing the linear recording velocity from 2.5 m/s (recording clock cycle T=10 ns) to 5.0 m/s (recording clock cycle T=5 ns) by using the same optical disc and information recording/reproducing apparatus as those used in the first embodiment.

The recording pulse width Ton(T) and cooling pulse width Toff(T) of each multi-value data are set to respective constant values for recording. Further, XYX patterns of 64 combinations are used as the test patterns.

As can be understood from FIG. 5, almost constant multi-value signal levels are obtained regardless of the linear velocity if the ratio of erasing power Pe to recording power Pw is changed with respect to the linear recording velocity V according to the first-order function Pe/Pw=aV+b. Depending on the characteristics of an optical disc, changes according to the second-order function Pe/Pw=aV$^2$+bV+c may produce better approximation (smaller square of standard deviation). In such a case, the second-order function may preferably be used.

In any case, a desired reproduced signal is obtained simply by changing the ratio of erasing power Pe to recording power Pw (Pe/Pw) according to the linear recording velocity, without setting a recording pulse length separately for each multi-value data.

The recording power Pw may be changed while maintaining a constant erasing power Pe, or the erasing power Pe may be changed while maintaining a constant recording power Pw. In either case, substantially the same results are obtained. A choice between these two may be made by taking into account the characteristics of the optical disc and the characteristics of the information recording/reproducing apparatus.

Figure 6:
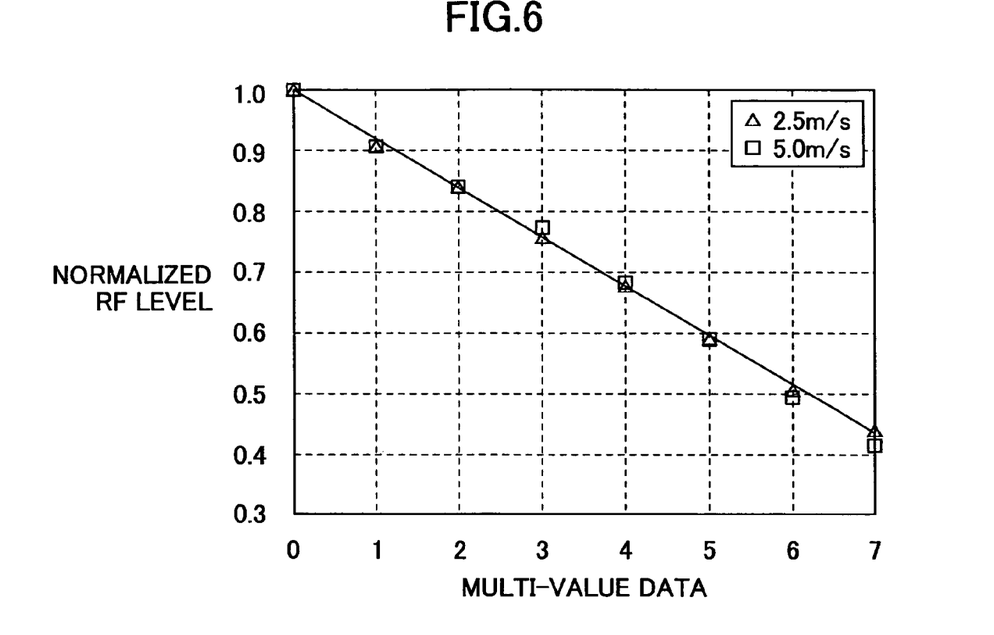
FIG. 6 is a drawing showing the relationship between the multi-value data and the reproduced signal level when recording is performed with the linear recording velocity being 2.5 m/s and 5.0 m/s and Pe/Pw being nearly equal to 0.47 and 0.51.

FIG. 6 is a drawing showing the relationship between the multi-value data and the reproduced signal level when recording is performed with the linear recording velocity being 2.5 m/s and 5.0 m/s and Pe/Pw being nearly equal to 0.47 and 0.51.

As shown in the figure, the ratio of erasing power Pe to recording power Pw can be optimized thereby to obtain almost constant signal levels regardless of the linear recording velocity.

In order to obtain a and b for the first-order function Pe/Pw=aV+b or a, b, and c for the second-order function Pe/Pw=aV$^2$+bV+c, trial writing is first performed with respect to a test recording area. An optimum value of the ratio of erasing power Pe to recording power Pw is then obtained with respect to each of the plurality of linear recording velocities.

Based on the obtained results, the first-order or second-order formula for approximation is computed. A choice between these two formulas is made by selecting one of the first-order approximation and the second-order approximation that produces a smaller square of standard deviation. The procedure for obtaining an optimum value of Pe/Pw for each linear recording velocity is the same as the procedure used in the first embodiment.

In this example, $\Sigma\delta^2$ is used to determine an optimum value. Alternatively, the ratio of erasing power Pe to recording power Pw may be set such that an error rate becomes smallest when random data is used for trial writing, followed by reproduction and then the discrimination of multi-values. This method is time consuming, but can produce a more accurate optimum value.

Further, the ratio of erasing power Pe to recording power Pw is changed according to the linear recording velocity, thereby producing almost constant reproduced signal levels. Because of this, multi-value data is properly discriminated without setting a multi-value discriminating threshold value, a waveform equalization coefficient, and the like separately for each linear velocity.

Third Embodiment

The information recording/reproducing method of a third embodiment changes the recording pulse width Ton and cooling pulse width Toff according to the linear recording velocity while maintaining a constant ratio of erasing power Pe to recording power Pw, thereby making adjustment such that the signal level becomes linear from multi-value data "0" to multi-value data "7". The results are shown in FIG. 7.

Figure 7:
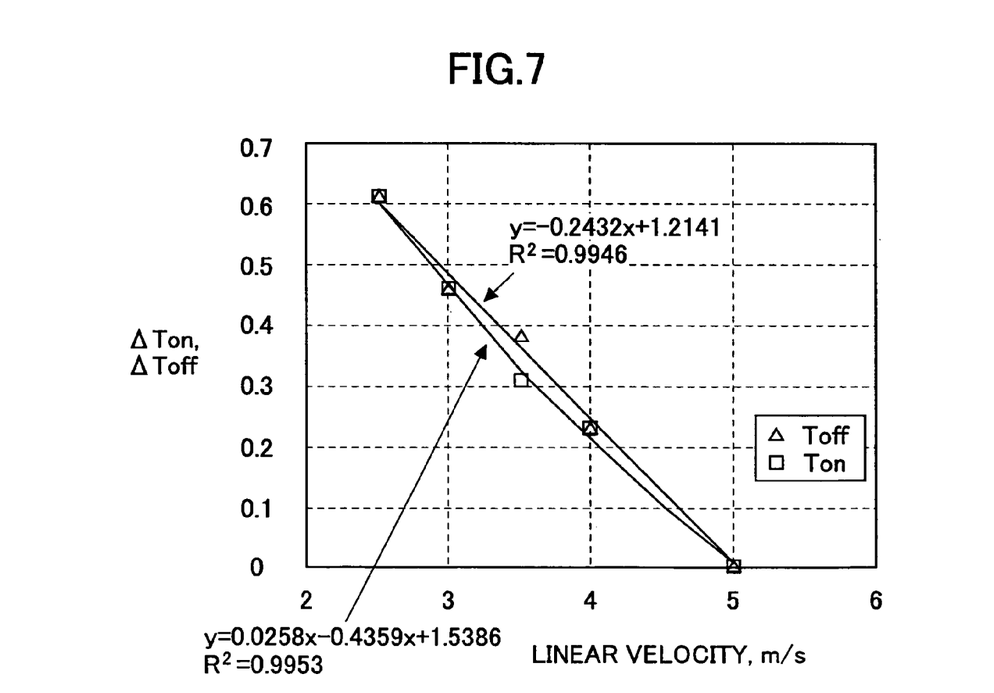
FIG. 7 is a drawing for explaining a case in which a recording pulse width and cooling pulse width are changed according to the linear recording velocity while maintaining a constant Pe/Pw ratio, thereby making adjustment such that a signal level becomes linear from multi-value data "0" to multi-value data "7"

FIG. 7 is a drawing for explaining a case in which the recording pulse width Ton and cooling pulse width Toff are changed according to the linear recording velocity while maintaining a constant ratio of erasing power Pe to recording power Pw, thereby making adjustment such that the signal level becomes linear from multi-value data "0" to multi-value data "7".

In FIG. 7, conditions corresponding to a linear recording velocity of 5.0 m/s are used as a standard.

As can be understood from FIG. 7, almost constant multi-value signal levels are obtained regardless of the linear velocity if the recording pulse width ΔTon or the cooling pulse width ΔToff is changed with respect to the linear recording velocity V according to the first-order function ΔTon (or ΔToff)=aV+b.

Depending on the characteristics of an optical disc, changes according to the second-order function ΔTon (or ΔToff)=aV²+bV+c may produce better approximation (smaller square of standard deviation). In such a case, the second-order function may preferably be used.

In any case, a desired reproduced signal is obtained simply by changing the recording pulse width ΔTon or the cooling pulse width ΔToff uniformly by a predetermined amount according to the linear recording velocity, without setting a recording pulse length separately for each multi-value data.

In the same manner as in the second embodiment, a and b for the first-order function or a, b, and c for the second-order function may be obtained.

In this manner, the recording pulse width ΔTon (or the cooling pulse width ΔToff) is changed according to the linear recording velocity, thereby producing almost constant reproduced signal levels. Because of this, multi-value data is properly discriminated without setting a multi-value discriminating threshold value, a waveform equalization coefficient, and the like separately for each linear velocity.

According to an information recording method in at least one embodiment of the embodiments described above, a ratio of recording power Pe to erasing power Pw is obtained first based on trial writing, and real writing is performed thereafter. This achieves stable information recording without being affected by product-to-product variation in optical discs and information recording apparatuses or being affected by changes in ambient conditions.

According to an information recording method in at least one embodiment of the embodiments described above, an optimum Toff_m is obtained first based on trial writing, and real writing is performed thereafter. This achieves stable information recording without being affected by product-to-product variation in optical discs and information recording apparatuses or being affected by changes in ambient conditions.

According to an information recording method in at least one embodiment of the embodiments described above, an optimum recording power Pw and optimum erasing power Pe that achieve a constant reproduced signal level across a range of linear velocities is obtained first, and, then, information is recorded. This makes it possible to discriminate multi-value data properly without setting parameters such as a multi-value discriminating threshold value and a waveform equalization coefficient separately for each linear velocity.

According to an information recording method in at least one embodiment of the embodiments described above, an optimum Toff_m or optimum Ton_m that achieves a constant reproduced signal level across a range of linear velocities is obtained first, and, then, information is recorded. This makes it possible to discriminate multi-value data properly without setting parameters such as a multi-value discriminating threshold value and a waveform equalization coefficient separately for each linear velocity.

According to an information recording method in at least one embodiment of the embodiments described above, a relational expression between the linear recording velocity and the optimum recording conditions is obtained based on the results of trial writing, and, then, the recording conditions are changed at the time of recording according to the relationship in response to the linear recording velocity. This makes it possible to form marks evenly over the entire surface of the disc. Accordingly, an almost constant reproduced signal level is achieved with respect to each linear recording velocity.

According to an information recording method in at least one embodiment of the embodiments described above, the test patterns include $M^2$ combinations of multi-value data patterns having front-back symmetry. This makes it possible to check the linearity of reproduced signal levels with respect to multi-value data in the case of inter-code interference being present.

According to an information recording method in at least one embodiment of the embodiments described above, $\Sigma\delta^2$ is used to determine optimum recording conditions. This makes it possible to determine optimum recording conditions in a short time.

As described above, according to the information recording method of the present invention, information is recorded in a stable manner for multi-value recording regardless of changes in ambient conditions and product-to-product variation in recording media such as optical discs and information recording apparatuses such as optical disc apparatuses for recording information on such recording media.

Also, in multi-value recording, information recording is achieved such that a substantially constant reproduced signal level is obtained over the entire surface of a recording medium when multi-value data is recorded by the CAV method with constant linear recording density.

Although the present invention has been described with reference to embodiments, the present invention is not limited to these embodiments, but various variations and modifications may be made without departing from the scope of the invention as set forth in the accompanying claims.

What is claimed is:

1. An information recording method that obtains optimum recording conditions for recording multi-value data on a recording medium, comprising:

recording a plurality of test patterns in a trial writing area of the recording medium, wherein, between recording of consecutive test patterns, a recording power Pw and an erasing power Pe are changed while maintaining a constant ratio between the recording power Pw and the erasing power Pe; and selecting an optimum recording power and an optimum erasing power as the recording power Pw and the erasing power Pe, respectively, that produce reproduced results in which a reproduced signal level is substantially linear with respect to the multi-value data, wherein each test pattern includes $M^2$ combinations of multi-value data patterns, each combination having front-back symmetry, for M-value recording of the multi-value data on the recording medium.

2. The information recording method as claimed in claim 1, wherein a recording condition of the recording power Pw for M-value recording of the multi-value data on the recording medium is selected such as to minimize $\Sigma\{Vm'-V(m)\}^2$ with respect to m=1, 2, . . . , M−1 in the reproduced results from the recording medium, where in is the multi-value data, Vm' is a sampled reproduced signal level of the multi-value data m, and $V(m)=m*(VM-1'-V0')/(M-1)+V0$ is a target signal level.

* * * * *